United States Patent
Cornwall et al.

(10) Patent No.: US 10,417,663 B2
(45) Date of Patent: Sep. 17, 2019

(54) EPHEMERAL GEOFENCE CAMPAIGN SYSTEM

(71) Applicant: INTERNATIONAL BUSINESS MACHINES CORPORATION, Armonk, NY (US)

(72) Inventors: Andrew B. Cornwall, Tempe, AZ (US); Lisa Seacat DeLuca, Baltimore, MD (US); Pooja M. Kotecha, Beacon, NY (US); Nicholas R. Sandonato, Raleigh, NC (US)

(73) Assignee: International Busienss Machines Corporation, Armonk, NY (US)

( * ) Notice: Subject to any disclaimer, the term of this patent is extended or adjusted under 35 U.S.C. 154(b) by 0 days.

(21) Appl. No.: 15/337,699

(22) Filed: Oct. 28, 2016

(65) Prior Publication Data

US 2018/0121957 A1 May 3, 2018

(51) Int. Cl.
*G06Q 30/02* (2012.01)

(52) U.S. Cl.
CPC ..... *G06Q 30/0261* (2013.01); *G06Q 30/0276* (2013.01)

(58) Field of Classification Search
USPC ......... 705/7.34, 14.45, 16; 455/456.2, 456.3, 455/405; 709/224; 717/178
See application file for complete search history.

(56) References Cited

U.S. PATENT DOCUMENTS 7,343,317 B2  3/2008 Jokinen et al.
7,912,630 B2  3/2011 Alewine et al.
8,812,027 B2 * 8/2014 Obermeyer ........ G08B 21/0277
                                                    455/456.1
9,043,329 B1  5/2015 Patton et al.
9,060,248 B1  6/2015 Coulombe et al.
(Continued)

FOREIGN PATENT DOCUMENTS

CN         1460373       12/2003
WO    WO-2007078816 A2 * 7/2007  ........... G01S 5/0027
WO        2012135155    10/2012

OTHER PUBLICATIONS

New Targeting With Geofencing (Keymedia Solutions) (Year: 2016).*
(Continued)

*Primary Examiner* — Tarek Elchanti
(74) *Attorney, Agent, or Firm* — Schmeiser, Olsen & Watts; Isaac J. Gooshaw

(57) ABSTRACT

Systems and methods for modifying campaign dependent geofences by creating marketing campaigns and linking the marketing campaign to a specific geofence. Each campaign-linked geofence may be capable of delivering the campaign messages to geofence participants during the duration of a marketing campaign and the geofence system may subsequently deactivate the geofence automatically after the marketing campaign has concluded. The systems and methods may map a geofence with a defined boundary to specified location on the map coinciding with the marketing campaign. As the tracked computer devices impinges on the borders of the market campaign's geofence, select messages may be received by the tracked computer devices, corresponding specifically to the events, promotions and advertisements of the campaign events during the time frame the events are active.

19 Claims, 9 Drawing Sheets

(56) References Cited

U.S. PATENT DOCUMENTS

| | | | |
|---|---|---|---|
| 9,100,795 B2 | 8/2015 | Sartipi et al. | |
| 9,194,955 B1 | 11/2015 | Fahrner et al. | |
| 9,226,105 B2 | 12/2015 | Turgman et al. | |
| 9,363,221 B1* | 6/2016 | Ozog | H04L 67/306 |
| 9,648,581 B1 | 5/2017 | Vaynblat | |
| 9,736,636 B1 | 8/2017 | Deluca et al. | |
| 9,756,607 B1 | 9/2017 | Deluca | |
| 2008/0139181 A1 | 6/2008 | Lokshin | |
| 2008/0248815 A1 | 10/2008 | Busch | |
| 2008/0312946 A1 | 12/2008 | Valentine et al. | |
| 2009/0164118 A1 | 6/2009 | Breen | |
| 2009/0197582 A1 | 8/2009 | Lewis et al. | |
| 2009/0258636 A1 | 10/2009 | Helvick | |
| 2010/0161207 A1 | 6/2010 | Do | |
| 2011/0093339 A1 | 4/2011 | Morton | |
| 2011/0314144 A1* | 12/2011 | Goodman | G06Q 10/06 709/224 |
| 2011/0320259 A1 | 12/2011 | Roumeliotis et al. | |
| 2012/0054028 A1 | 3/2012 | Tengler et al. | |
| 2012/0271715 A1 | 10/2012 | Morton et al. | |
| 2012/0310741 A1 | 12/2012 | Uyeki et al. | |
| 2013/0030931 A1* | 1/2013 | Moshfeghi | G01S 19/48 705/16 |
| 2013/0045760 A1 | 2/2013 | Obermeyer et al. | |
| 2013/0267253 A1 | 10/2013 | Case et al. | |
| 2013/0326137 A1 | 12/2013 | Bilange et al. | |
| 2013/0332274 A1 | 12/2013 | Faith et al. | |
| 2014/0057648 A1 | 2/2014 | Lyman et al. | |
| 2014/0155094 A1 | 6/2014 | Zises | |
| 2014/0162692 A1 | 6/2014 | Li et al. | |
| 2014/0164118 A1 | 6/2014 | Polachi | |
| 2014/0279015 A1 | 9/2014 | Root et al. | |
| 2014/0337123 A1* | 11/2014 | Nuernberg | G06Q 30/0246 705/14.45 |
| 2014/0351030 A1 | 11/2014 | Priebatsch | |
| 2014/0379430 A1* | 12/2014 | Kritt | H04W 4/029 705/7.34 |
| 2015/0011237 A1 | 1/2015 | Obermeyer et al. | |
| 2015/0024773 A1 | 1/2015 | Li et al. | |
| 2015/0099461 A1 | 4/2015 | Holden et al. | |
| 2015/0120453 A1 | 4/2015 | Lee et al. | |
| 2015/0199704 A1 | 7/2015 | Gottesman et al. | |
| 2015/0220993 A1 | 8/2015 | Bente | |
| 2015/0269167 A1 | 9/2015 | Tseng | |
| 2015/0269624 A1 | 9/2015 | Cheng et al. | |
| 2015/0271638 A1 | 9/2015 | Menayas et al. | |
| 2015/0271639 A1 | 9/2015 | Ziskind et al. | |
| 2015/0341747 A1* | 11/2015 | Barrand | G06Q 30/0201 455/405 |
| 2015/0355893 A1* | 12/2015 | Luk | G06F 8/62 717/178 |
| 2015/0365796 A1 | 12/2015 | Toni | |
| 2016/0007151 A1* | 1/2016 | Birch | H04W 4/021 455/456.3 |
| 2016/0014559 A1 | 1/2016 | Hakanson | |
| 2016/0027056 A1 | 1/2016 | Taslimi | |
| 2016/0034961 A1 | 2/2016 | May et al. | |
| 2016/0057573 A1 | 2/2016 | Chang et al. | |
| 2016/0057576 A1 | 2/2016 | Kessler et al. | |
| 2016/0061609 A1 | 3/2016 | Dickey et al. | |
| 2016/0066141 A1 | 3/2016 | Jain et al. | |
| 2016/0080486 A1 | 3/2016 | Ram et al. | |
| 2016/0183052 A1 | 6/2016 | Qiu | |
| 2016/0253710 A1 | 9/2016 | Publicover et al. | |
| 2017/0019761 A1 | 1/2017 | Heo | |
| 2017/0142548 A1 | 5/2017 | Buskirk et al. | |

OTHER PUBLICATIONS

Friedman, Jack P.; Updated List of IBM Patents or Patent Applications Treated as Related; Dec. 29, 2016; 1 page.

Levent Besik and Alessio Pace, Systems and Methods of Managing Geofences, Technical Disclosure Commons, Apr. 22, 2016, pp. 10.

Friedman, Jack P.; List of IBM Patents or Patent Applications Treated as Related; Oct. 28, 2016; 1 page.

Bareth, Ulrich et al.; geoXmart—A Marketplace for Geofence-Based Mobile Services; 2010 34th Annual IEEE Computer Software and Applications Conference; Jul. 19-23, 2010; pp. 101-106.

Friedman, Jack P.; Updated List of IBM Patents or Patent Applications Treated as Related; Feb. 1, 2017; 1 page.

Friedman, Jack P.; List of IBM Patents or Patent Applications Treated as Related; Oct. 4, 2017; 1 page.

Hendrix, Phil, Dr.; Watch this Space—How Mobile and Beacons Are Enhancing the Value of Out-of-Home Media for Advertisers and Mobile App Partners; A whitpaper sponsored by Gimbal; Aug. 2015; 23 pages.

Mell, Peter et al.; The NIST Definition of Cloud Computing; National Institute of Standards and Technology; Special Publication 800-145; Sep. 2011; 7 pages.

Neilsen Norman Group; Evidence-Based user Experience Research, Training and Consulting; https://www.nngroup.com; retrieved from the Internet Sep. 28, 2017; 5 pages.

Ruckus Wireless; Location: The New Battlefield for Business & Digital Innovation; www.ruckuswireless.com; 2014; 9 pages.

Ahmed, Nasimuddim et al.; SmartEvacTrak: a People Counting and Coarse-Level Localization Solution for Efficient Evacuation of Large Buildings; 2015 IEEE International Conference on Pervasive Computing and Communication Workshops (PerCom Workshops); Mar. 23-27, 2015; pp. 372-377.

Chu, Hon et al.; I am a Smartphone and I Know My User is Driving; 2014 Sixth International Conference on Communication Systems and Networks (COMSNETS); Jan. 6-10, 2014; 8 pages.

Friedman, Jack P.; List of IBM Patents or Patent Applications Treated as Related; Sep. 7, 2017; 1 page.

Roy, Nirupam et al.; I am a Smartphone and I can Tell my User's Walking Direction; Proceedings of the 12th Annual International conference on Mobile Systems, Applications and Services; Jun. 16-19, 2014; pp. 329-342.

Zin, M.S.I.M et al.; Development of Auto-Notification Application for Mobile Device using Geofencing Technique; Journal of Telecommunication, Electronic and Computer Engineering (JTEC) vol. 7, No. 2, Jul.-Dec. 2015, pp. 169-173.

* cited by examiner

EPHEMERAL GEOFENCE CAMPAIGN SYSTEM

TECHNICAL FIELD

The present disclosure relates generally to systems, methods and tools for creating, displaying and utilizing geofences.

BACKGROUND

As portable devices, such as mobile communication systems, smart phones, tablet computers, laptops and navigation devices, become more advanced and powerful, these portable devices increasingly provide locational guidance to users in real time. More recently, portable devices have introduced a concept known as geo-fencing. A geofence is a virtual perimeter around a real-world location. Portable devices that implement geo-fencing functionalities may alert the user when the portable device has entered or exited an established geofence.

A geofence's perimeter may be virtually established around a point of interest such as an address, a store, or a home. Programs that incorporate geo-fencing allow an administrator of a geofence to set up triggers so when a device enters (or exits) the boundaries of the geofence (defined by the administrator), a text message or email alert is sent. Many geo-fencing applications incorporate Google® Earth, allowing administrators to define boundaries on top of a satellite view of a specific geographical area. Other applications may define boundaries by longitude and latitude or through user-created and Web-based maps.

SUMMARY

A first embodiment of the present disclosure provides a method for modifying a campaign dependent geofence comprising the steps of: creating, by a processor of a computer system, a marketing campaign comprising one or more campaign messages; scheduling, by the processor, a start date and an end date to the marketing campaign; mapping, by the processor, a geofence having a specified boundary with a location and size, and parameters corresponding to the marketing campaign including the start date, the end date and the one or more campaign messages; and automatically deactivating, by the processor, the geofence as a function of the end date of the marketing campaign.

A second embodiment of the present disclosure provides a computer system, comprising: a central processing unit (CPU); a memory device coupled to the CPU; and a computer readable storage device coupled to the processor, wherein the storage device contains program code executable by the CPU via the memory device to implement a method for modifying a campaign dependent geofence comprising the steps of: creating, by the CPU, a marketing campaign comprising one or more campaign messages; scheduling, by the CPU, a start date and an end date to the marketing campaign; mapping, by the CPU, a geofence having a specified location and size, and parameters corresponding to the marketing campaign including the start date, the end date and the one or more campaign messages; and automatically deactivating, by the CPU, the geofence as a function of the end date.

A third embodiment of the present disclosure provides a computer program product comprising: one or more computer readable hardware storage devices having computer readable program code stored therein, said program code containing instructions executable by the one or more central processing units (CPU) to implement a method for modifying a campaign dependent geofence comprising the steps of: creating, by the CPU, a marketing campaign comprising one or more campaign messages; scheduling, by the CPU, a start date and an end date to the marketing campaign; mapping, by the CPU, a geofence having a specified location and size, and parameters corresponding to the marketing campaign including the start date, the end date and the one or more campaign messages; and automatically deactivating, by the CPU, the geofence as a function of the end date.

DETAILED DESCRIPTION

Overview

Figure 1:
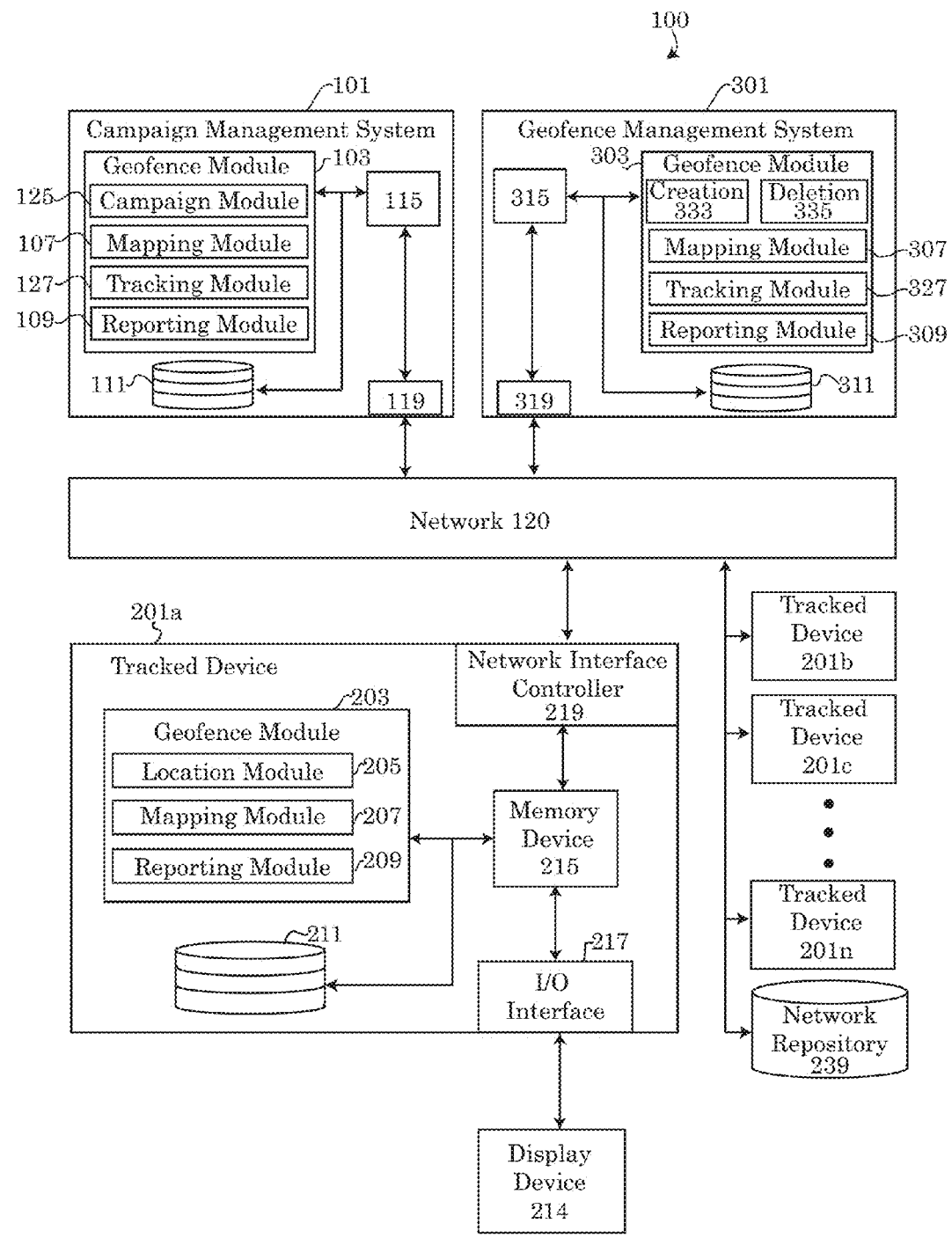
FIG. 1 depicts a schematic view of embodiment of a system for modifying a campaign dependent geofence consistent with the embodiments of the present disclosure.

Embodiments of the present disclosure recognize that currently available geofence systems displaying messages to users, potential clients and computer systems are neither self-creating nor self-terminating. When currently available geofences are created, the virtual barrier may persist perpetually and display a pre-programmed message. Often users or administrators of each geofence may forget to remove or deactivate the geofence after the displayed message is no longer relevant or an event has concluded. The presence of persistent geofences may pose a problem due to the current geo-fencing device limitations. Mobile computing devices operating on the Android operating system may be limited to 100 active geofences. Likewise, mobile computing devices equipped with an iOS operating system may be limited to merely 20 active geofences. Irrelevant geofences remaining in the memory of the operating system may interfere with retrieving or mapping currently relevant geofences that may otherwise be unavailable or un-viewable.

Embodiments of the system for modifying campaign dependent geofences improve upon currently available geofence systems by creating marketing campaigns and linking the marketing campaign to a specific geofence. Each campaign-linked geofence may be capable of delivering the campaign messages to geofence participants during the duration of a marketing campaign and the geofence system may subsequently deactivate the geofence automatically after the marketing campaign has concluded. Embodiments of the computer systems managing the campaigns may define the date a marketing campaign begins and the date in which the marketing campaign ends. Simultaneously, the geofence linked to the marketing campaign may be generated and actively display marketing campaign messages during the defined marketing campaign duration. Embodiments of the campaign management systems may transmit campaign messages to computer devices entering, exiting or dwelling within the market campaign's geofence during the active time period.

In some embodiments, a campaign management system may map a geofence with a defined boundary to specified location on the map. The campaign management system may track one or more tracked computer devices entering, exiting and dwelling within the geofence linked to the marketing campaign. Embodiments of the campaign management system may track the computer devices using Global Positioning Satellites (GPS), Wi-Fi, Bluetooth, cell tower triangulation or other location techniques. As the tracked computer devices impinges on the borders of the market campaign's geofence, select messages may be received by the tracked computer devices, corresponding specifically to the events, promotions and advertisements of the marketing campaign.

Embodiments of the geofences may be visibly displayed on a mapping interface of the tracked computer systems. The campaign management systems may load one or more geofences tied to the marketing campaign into the memory devices of the tracked computer devices for a specified time period of the marketing campaign. Subsequently, after the marketing campaign has concluded, the tracked computer device may no longer receive campaign messages or visibly observe the presence of a particular geofence tied to the expired marketing campaign. The tracked computer device and/or the campaign management system may deactivate, remove and/or delete the expired geofences at the conclusion of the marketing campaigns or a specified time thereafter.

System for Modifying Campaign Geofences

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 9:
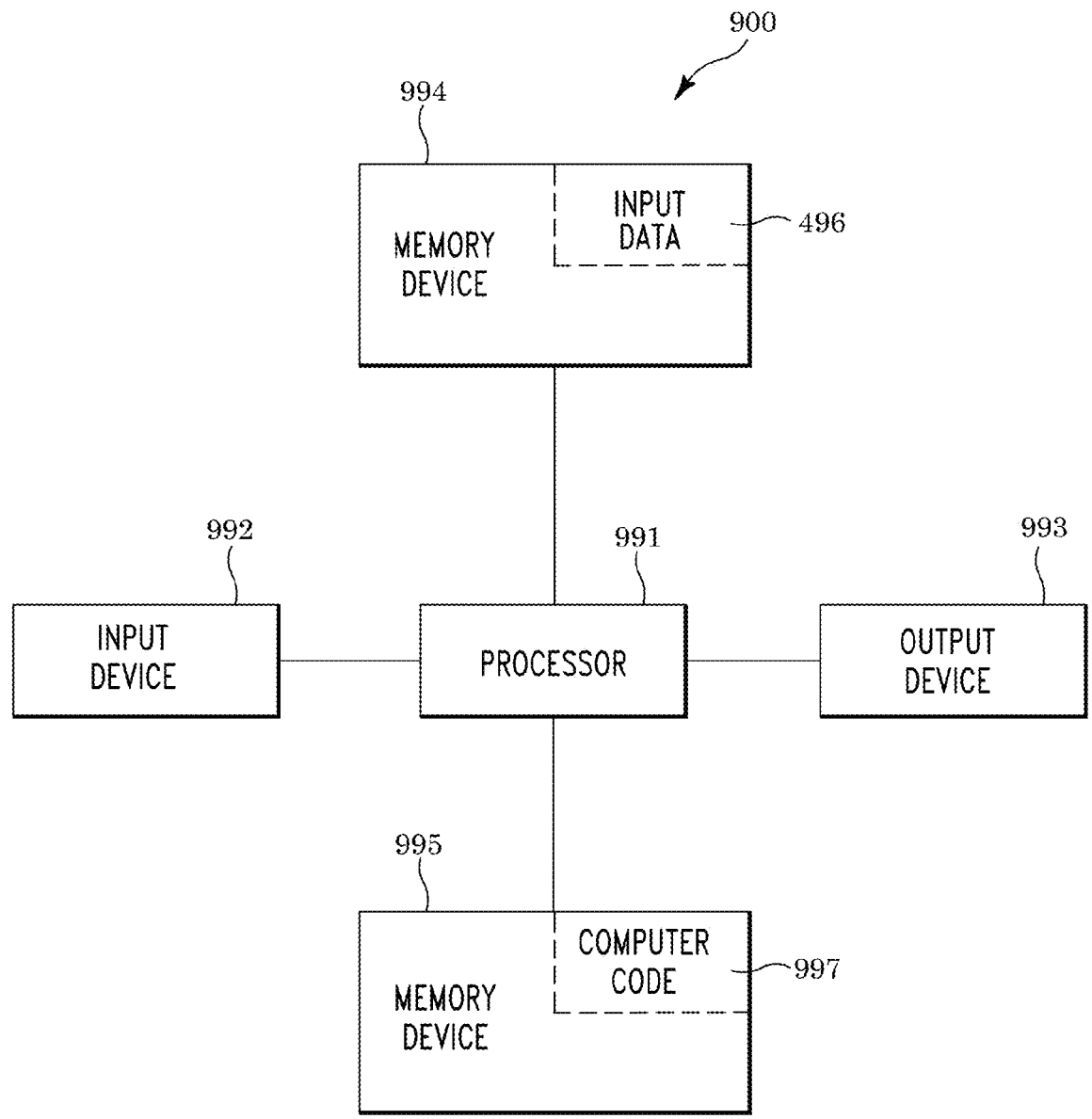
FIG. 9 depicts a block diagram of an embodiment of a generic computer system capable of implementing methods for modifying a campaign dependent geofence consistent with the embodiments described in this application.

Referring to the drawings, FIG. 1 depicts a block diagram of an ephemeral geofence campaign system 100 (hereinafter "geofence system 100") for modifying geofences linked or connected to a one or more marketing campaigns. Embodiments of the geofence system 100 may include a plurality of one or more computer systems, including a campaign management system 101, a tracked computer device 201a, 201b, 201c... 201n (referred collectively as "tracked device 201") and a geofence management system 301. The computer systems 101, 201, 301 may each be a specialized computer system, having specialized configurations of hardware, software or a combination thereof as depicted in FIGS. 1-7 of the present disclosure and in the embodiments described herein. Embodiments of the computer systems 101, 201, 301 may not only comprise the elements of the systems and devices depicted in FIG. 1-7, but may also incorporate one or more elements of a generic computer system as shown in FIG. 9 and described in detail below. Elements of the generic computer system of FIG. 9 may be integrated into the specialized computer systems 101, 201, 301 of FIGS. 1-7.

Each of the computer systems 101, 201, 301 may each be connected and placed in communication with one another over a computer network 120. Embodiments of the network 120 may be constructed using wired or wireless connections between each hardware component connected to the network 120. As shown in the exemplary embodiments, each of the computer systems 101, 201, 301 may connect to the network 120 and communicate over the network using a network interface controller (NIC) 119, 219, 319 or other network communication hardware. Embodiments of the NICs 119, 219, 319 may implement specialized electronic circuitry allowing for communication using a specific physical layer and a data link layer standard such as Ethernet, Fibre channel, Wi-Fi or Token Ring. The NIC 119, 219, 319 may further allow for a full network protocol stack, enabling communication over network 120 to the group of computer systems or other computing hardware devices linked together through communication channels. The network 120 may facilitate communication and resource sharing among the computer systems 101, 201, 301 and additional hardware devices connected to the network 120, for example a network repository 239. Examples of network 120 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

In some embodiments of the geofence system 100, the geofence system 100 may include a campaign management system 101. The campaign management system 101 may perform the functions, tasks and services of system 100 directed toward creating a marketing campaign, campaign messages and messaging events associated with the marketing campaign. The campaign management system 101 may provide configuration information to the geofence management system 301 during the geofence setup, link the geofence to the marketing campaign, track the status of the marketing campaign and the success of the campaign messages being delivered to tracked devices 201 encountering the marketing campaign's geofence.

Embodiments of the campaign management system 101 may include a geofence module 103. The term "module" may refer to a hardware based module, software based module or a module may be a combination of hardware and software resources. A module (whether hardware, software, or a combination thereof) may be designed to implement or execute one or more particular functions, tasks or routines of the systems. Embodiments of hardware based modules may include self-contained components such as chipsets, specialized circuitry and one or more memory devices. A software-based module may be part of a program code or linked to program code containing specific programmed instructions loaded in the memory device 115, 215, 315 of the specialized computer systems 101, 201, 301 of the geofence system 100. Embodiments of the geofence module 103, whether hardware, software or a combination thereof, may perform the functions and tasks associated with the creating the marketing campaign, linking the campaign to a geofence, mapping the geofence onto a user interface viewable by a tracking device 201, tracking the interactions between the tracking devices 201 and the geofence as well as reporting the interactions tracked by the campaign management system 101. Embodiments of the geofence module 103 of the campaign management system 101 may include sub-modules designated with performing the individual tasks, routines and services of the geofence module 103. Various embodiments of the geofence module 103 may comprise a campaign module 125, mapping module 107, tracking module 127 and a reporting module 109.

Embodiments of the campaign module 125 may perform the task of creating, organizing, storing and transmitting marketing campaign data, including the creation, storage and transmission of campaign messages integrated into the geofences. In some embodiments, the campaign module 125 may store the created campaign messages in a campaign management database 111. The campaign module 125 may query the campaign management database 111 in response to campaign participant activity, requests made by a geofence management system or a tracked device 201 to receive campaign messages as a function of the tracked device's 201 interaction with a campaign event being mapped onto a geofence.

In some embodiments, the campaign module 125 may set one or more parameters of the marketing campaign being stored and managed by the campaign management system 101 and the campaign management database. During the creation of a marketing campaign, a user may provide campaign input data 206 into the campaign management system 101 to set the configuration of the marketing campaign. For example, the campaign input data 206 entered into the campaign management system 101 may direct the campaign module 125 to configure a campaign with a specified start date, start time, end date and end time for the marketing campaign. The campaign input data 206 may further define parameters for the campaign module 125 to create a marketing campaign. The campaign input data 206 may include information such as the organizer of the campaign, for example the individuals or companies running a promotion, the locations or regions that may be included or excluded from the marketing campaign. Additionally, the campaign input data 206 may further direct the campaign module's 125 creation or selection of the specific campaign messages, promotions, advertisements or other intellectual property associated with the marketing campaign that may be delivered to participants of the campaign. Embodiments of the campaign module 125 may load the marketing campaign, the campaign's parameters and the campaign messages into memory device 115 or the campaign management database 111. The campaign module 125 may modify, transmit or retrieve the marketing campaign data configured and stored by the campaign management system 101 at a later point in time or when requested to do so by a separate computing system such as the geofence management system 301 or tracked device 201.

In some embodiments of the campaign management system 101, the geofence module 103 may further include a mapping module 107. The mapping module 107 may perform the function of configuring the campaign dependent geofences, communicating with the geofence management system 301 during the geofence creation process. During the configuration of the geofence, an administrator of the geofence may utilize the campaign management system 101 to set one or more parameters of the geofence, and link the geofence to marketing campaign of the campaign module 125. For example, the mapping module 107 may receive geofence configuration data 306 from an administrator of the campaign management system defining the properties of the geofence. The geofence configuration data may include data defining the geofence's identifying name, location, and size or boundary limits (i.e. longitude, latitude and radius). In some embodiments, the geofence configuration data 306 entered into the mapping module 107 may include input data defining a start date and time as well as the end date and time (also referred to as the expiration date) of the geofence.

In the exemplary embodiment of the geofence system 100, the mapping module 107 may retrieve creations and expiration dates for the geofence from the campaign module 125. The mapping module 107 may execute a command to load the marketing campaign's parameters created by the campaign module 125 into the memory device 115 of the campaign management system 101 during the geofence configuration process. In alternative embodiments, mapping module 107 may import or apply the parameters of the marketing campaign stored by the campaign management database 111 into the mapping module. For example, the mapping module 107 may be programmed to retrieve and load a marketing campaign by a name previously designated by the campaign module 125.

Geofence configuration data 306 inputted into the mapping module 107 may further configure one or more acceptable geofence transitions. The geofence transitions may trigger the transmission of a campaign message to a tracked device 201 interacting with the geofence once the geofence has been established and activated. Examples of transitions may include entering the geofence, exiting the geofence or dwelling within a geofence. The mapping module 107 may configure s response provided by the geofence upon the occurrence of one or more of the programmed transitions. For example, in some embodiments, when a tracked device 201 breaches the boundary of the geofence and enters the geofence area, a campaign message may be transmitted to the tracked device 201, describing nearby events, activities and promotions. Similarly, the exit transition may be programmed to allow for the campaign management system 101 to deliver a campaign message when a tracked device 201 exits the geofence. For instance, the campaign message may thank the user for participating in the marketing campaign and/or inform a campaign participant about upcoming promotions to look out for in the geofence space that the participant had just exited. Likewise, in some embodiments, where the transition selected is a "dwell" action, the mapping module 107 may configure the geofence to transmit a campaign message to a tracked device 201 once the tracked device has maintained a location within the geofence for a pre-set or pre-programmed amount of time.

Embodiments of the mapping module 107 may transmit the configuration settings of the geofence from the campaign management system 101 to the geofence management system 301. The transmission may occur over network 120. For example, the mapping module 107 may transmit an API call from the campaign management system 101 to the geofence management system 301, requesting the geofence management system 301 create a geofence with the properties prescribed by the mapping module 107. Once the geofence has been created by the geofence management system, the mapping module 107 may receive the data of the created geofence and load the created geofence into memory device 115 of the campaign management system 101. The mapping module 107 may further plot each of the marketing campaign's geofences onto a mapping interface 302 depicting the location of each created geofence as shown in the examples of FIGS. 3-6 of the current application.

Embodiments of the geofence module 103 may further comprise a tracking module 127. The tracking module 127 may perform the tasks of collecting data and statistics about the geofence and the associated marketing campaign. The tracking module 127 may identify tracked devices 201 entering, exiting or dwelling within the geofences and record the movements of the devices 201 by collecting location data from each of the tracked devices 201 or receiving the collected location data from a geofence management system 301. The tracking module 127 may be responsible for gauging the success or failure of a marketing campaign as a function of the tracked devices 201 interacting with the geofence and participating with the campaign messages being delivered to the tracked devices 201.

Embodiments of the tracking module 127 may further collect and store identifying information about each of the users and the user's tracked devices 201. Identifying information data 210 may include a user's name, age, email address, home address, social media usernames and location information provided to the tracked device 201. The tracking module 127 and/or tracking module 327 may collect statistical information that may draw conclusions of the success or failure of the marketing campaign and geofence. For example, the tracking module 127 may analyze the number of tracked devices 201 triggering a campaign message to be delivered, the viewing time of the campaign messages, whether or not the campaign messages were accepted or deleted, whether or not user's of the tracking device 201 participated in the content of the campaign messages being delivered as well as identifying demographics such as the age of the users receiving the campaign messages.

Embodiments of the tracking module 127 may analyze the data collected from the tracked devices 201 and draw conclusions about the efficiency of the campaign, the target demographics and potential improvements to the campaign or geofence. The tracking module 127 may compare the geofence and marketing campaign data with previous campaigns and geofences to identify the success of the campaign relative to previous campaigns that may have previously expired. The tracking module 127 may report the statistics and conclusions to the reporting module 109.

Embodiments of the reporting module 109 may generate one or more reports as a function of the statistics and conclusions collected and drawn by the tracking module 127. The reporting module 109 may present and display reports of the marketing campaign and campaign linked geofence to an administrator of the campaign management system 101. In some embodiments, the statistics, conclusions and data collected by the tracking module 107 may be archived in the campaign management database 111 or a network accessible repository 239 for further analysis or comparison with future marketing campaigns and geofences. In some embodiments, the reporting module 109 may report the presence of future campaign dependent geofences that may not have been activated yet, but are scheduled to be activated at the start of a corresponding upcoming marketing campaign. Embodiments of the reporting module may generate and display a report to the campaign management system 101 in some embodiments that provides a detailed listing of the active and pending marketing campaigns as well as the corresponding active and pending geofences scheduled to activate at the start of an upcoming marketing campaign start date.

As shown in FIG. 1, embodiments of the geofence system 100 may include a geofence management system 301, briefly described above. The geofence management system 301 may perform the tasks and functions of creating, deleting, mapping, tracking and generating geofences affiliated with a marketing campaign. The geofence management system 301 may perform tasks of the geofence system 100 in a manner designated by the campaign management system 101 and further perform the task of serving the created geofences to a plurality of computer devices being tracked by the campaign management system 101 and geofence management system (i.e. tracked devices 201). The geofence management system 301 may include a geofence module 303 to perform the designated tasks and functions a geofence management system 301.

Similar to the geofence module 103 of the campaign management system 101, the geofence module 303 of the geofence management system 301 may be a hardware module containing specialized chipsets and circuitry and/or or a software module loaded in the memory device 315 of the geofence management system 301. Embodiments of the geofence module 303 may include a creation module 333, deletion module 335, mapping module 307, tracking module 327 and a reporting module 309.

Embodiments of the creation module 333 may perform the task of generating the geofence corresponding to the marketing campaign data 206 and the geofence configuration data 306 inputted into the campaign mapping module 107. The creation module 333 may receive the configuration settings for the geofence from the mapping module 107 and/or the campaign module 125 of the campaign management system 101. The request to build the geofence to the specification of the campaign management system 101 may be received from the campaign management system in the form of an API call. The API call may be loaded in the memory device 315 of the geofence management system 301. The creation module 333 may analyze configuration settings of the geofence requested by the campaign management system, confirm the settings are feasible or error free. If configuration settings for the geofence are infeasible or contain errors, the geofence creation module 333 may deny the request and further request a correction to the errors. Otherwise, if the configuration settings are feasible and error free, the creation module 333 may build the geofence according to the parameters, including the requested duration, expiration date, start time, start date, end time, end date, location, size, the applicable transitions and campaign messages that may be delivered to devices meeting the transition settings. The creation module 333 may automatically activate each of the geofences according to the start date/time. In some embodiments, the activation of the geofence may not occur immediately upon creation. Instead, the activation may be delayed to meet the start date/time of the marketing campaign.

Embodiments of the creation module 333 may save and store the geofence and the geofence parameters in a geofence management database 311 or network accessible database, repository 239, data mart or other data structure. Saving and storing the geofence and the geofence configuration settings or parameters (including campaign messages) may, in some embodiments, allow for the geofence management module 301 to repeatedly create the same geofences periodically, as instructed by the campaign management system 101. For example, a particular marketing campaign may occur every week, every month, every year, etc. The campaign management system 101 may in some embodiments, send an API call to execute a geofence by a particular geofence name or marketing campaign name. In response, the creation module 333 may query or lookup the geofence management database 311 and load the previously stored configuration settings and parameters into memory device 315 and update the database entry to include a newly scheduled stating date, duration and expiration date.

Embodiments of the geofence module 303 may further comprise a mapping module 307. The mapping module 307 may perform the tasks of loading one or more active geofences to a mapping interface 302, accessible by one or more tracked devices 201. The mapping module 307 may serve the geofences (created by the creation module 333) to one or more tracked devices 201 accessing the geofence over network 120. Tracked devices 201 connecting to the geofence management system 301 may retrieve, store, download or actively stream the geofence data over network 120. Embodiments of the tracking module 327 may collect location data 106, identifying user information, statistics of the geofence, the number transitions activated by tracked devices 201, the number of campaign messages served to the tracked devices 201 and transmit the collected data from the geofence management system 301 to the tracking module 127 of the campaign management system. The tracking module 327 may identify conditions giving rise to the transmission of the associated campaign messages, including the identification of tracked devices meeting the transitions requirements (enter, exit, dwell) configured by the campaign management system 101. As a tracked device 201 receiving the geofence impinge on a virtual boundary of the geofence mapped by the mapping module 307, or dwells within the virtual boundaries of the geofence, the tracking module 327 may identify the triggering transition and transmit the associated campaign message resulting from transition's occurrence.

Embodiments of the mapping module 307 may transmit push notifications to the tracked devices 201, including push notifications, emails, text messages or messaging services containing campaign messages during active periods of a marketing campaign for a particular geofence. The push notifications transmitted from the geofence mapping module 307 to the device's mapping module 207 may be triggered as a function of the tracking module 327 identifying a tracked device 201 transitioning into an active geofence. In some embodiments, the mapping module 307 may be loaded with one or more secondary messages. A secondary message may be pushed to a tracked device 201 that has entered, exited or dwelled within a campaign's geofence prior to the campaign activation date or after the campaign has expired. Secondary message being pushed to the tracked device may inform the user of the tracked device 201 to come back during the dates of the campaign or to stay tuned for future campaigns that may occur within the particular geofence.

In some embodiments of the geofence management system 301, the geofence module 303 may include a reporting module 309. The reporting module 309 of the geofence management system 301 may perform the function of transmitting statistical information about the geofence and information collected by the geofence management system 301 during the activation of the geofence. The reporting module 309 may transmit the data to one or more computer systems 101, 201 over network 120. For example, the reporting module 309 may be responsible for transmitting data collected by the tracking module 327 to the campaign tracking module 127. The reporting module 309 may transmit statistics and data that may assist the campaign tracking module 127 with identifying the success or failure of the marketing campaign, the number of interactions users have with the geofence, demographic information about users interacting with the geofence, the attachment rate or rate at which campaign messages were positively or negatively received and/or acted upon by users of a tracked device 201. The reporting module 309 may further identify whether the status if the geofence and whether or not the geofence is currently active, deactivated or deleted by the deletion module 335. Embodiments of geofences system 100 may select a deletion date for deleting the geofence that may occur at the end date of the marketing campaign or in alternative embodiments, the deletion date may occur automatically at a pre-set time after the marketing campaign has concluded.

In some embodiments of the geofence system 100, the system 100 may include one or more tracked devices 201 connected to the campaign management system 101 and geofence management system 301 via computer network 120. A tracked device 201 may be any type of mobile computing device that may move or change locations. Some examples of a tracked device 201 may include, but are not limited to mobile communication devices, smart phones, cell phones, laptops, tablet computers, smart watches and glasses, persona data assistants (PDA) and wireless or internet enabled media devices. The tracked devices 201 may be any type of touch point device capable of acting as a point of interaction with the geofence created by the geofence management system 301. The tracked devices 201 are not limited only to the number of devices depicted in the figures of the current application. Any number of tracked devices 201 may part of the geofence system 100 and connected to network 120. As shown in FIG. 1, the number of tracked devices is open ended. The tracked devices 201 include tracked devices 201a, 201b, 201c . . . 201n, wherein the ellipses represent a infinite number of tracked devices that may be present between 201c and the nth tracking device identified as the last device in the set of a plurality of tracked devices 201.

Embodiments of the tracked devices 201 may include a geofence module 203. The geofence module 203 may provide access and interaction with the marketing campaign associated geofence created by the geofence management system 301 and the campaign management system 101. The geofence module 203 may be specialized hardware physically connected within the tracked device or the geofence module 203 may be software program or program instructions loaded in the memory device 215 of the tracked device 201. In alternative embodiments, the geofence module 203 providing access to the geofence and marketing campaign messages may be virtualized hardware that may be physically located via network 120 or a remotely accessible program executing program instructions for transmitting, receiving and displaying the data of the geofences. For example, the tracked device 201 may be accessing a virtualized geofence module through program or application services maintained by a cloud computing network.

Embodiments of the geofence module 203 may include a location module 205. The location module 203 may be comprised of hardware and/or software capable of utilizing a positioning system to pinpoint the current location of the tracking device 201 and/or previous positions of the tracked device 201 that may be stored in the memory device 215 or database 211. For example the location module may utilize the positioning capabilities of the global positioning system (GPS), Wi-Fi, Bluetooth of Bluetooth low energy beacons, cell tower triangulation or a combination of positional systems. In some embodiments, the location module 205 may include a transmitter, receiver and/or transceiver for receiving location data from a positioning system or broadcasting the location data to the campaign management system 101 and/or the geofence management system 301. Embodiments of the location module 205 may save, store and update one or more sets of location information to a memory device onboard the location module or, the location module 205 may store the location information to memory device 215 or database. The location module 205 may communicate the stored location data 106 to the geofence management system 301 and campaign management system 101 in order to allow each system to track the location of the tracked device 201, compare the location information with the established geofences of the marketing campaign, collect relevant data about the tracked device 201 or the device's user, entering, exiting or dwelling within the established geofence and push campaign messages to the devices 201 meeting the transitioning conditions of the geofence.

The tracked device 201 may further comprise a mapping module 207. The mapping module 207 may perform he function of pinpointing the current location of the tracked device 201, monitor the position of the tracked device 201 in real time as the tracked device changes location and display the location of the tracked device 201 in relation to the position of each campaign geofence. Embodiments of the mapping module 207 may receive the data of the geofence from the geofence module 303 of the geofence management system 301. In particular, the mapping module 207 may download or retrieve geofence data from the geofence mapping module 307. The device's mapping module 207 may plot each of the geofences as a function of the geofence data onto a mapping interface 302 which may be displayed by a display device 214 of the tracked device 201. As shown by the Example in FIG. 3, the mapping module 207 may display the device location 304 onto a map interface 302 in real time, as a function of the location data 106 collected by the location module 205. The map interface 302 may depict the location surrounding the tracked device's current device location 304. As the tracked device 201 updates the location information of the location module 205, the device location 304 may be mapped onto the mapping interface 302 accordingly.

Figure 4:
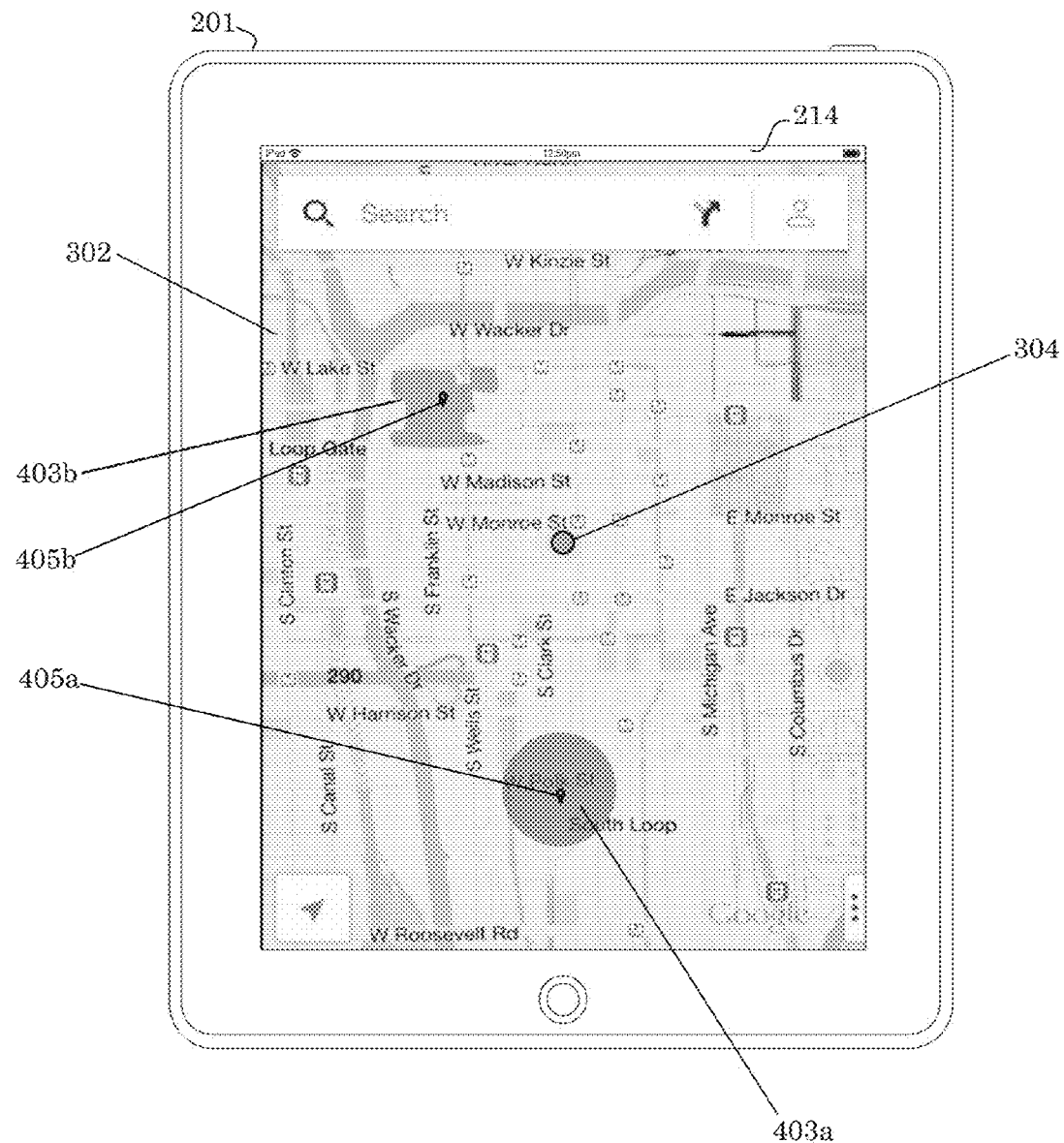
FIG. 4 illustrates an embodiment of the mapping interface of FIG. 3 having an embodiment of an active geofence tied to a marketing campaign mapped thereon.

As shown in FIG. 4, the mapping module 207 may display geofence events 405a, 405b and a surrounding geofence boundary 403a, 403b onto the mapping interface 302. The locations of each geofence event 405a, 405b and the size of the geofence boundaries 403a, 403b may be defined by the configuration settings prescribed by the mapping module 107 of the campaign management system 101 and subsequently created by the geofence management system 301. Each geofence event 403a, 403b may be tied to a region, store, public location, live event occurring in real time, or any other type of event. The timing of the geofence event 403a, 403b and the associated marketing campaign may be predetermined and/or timed to a specific start date/times and end date/times of a particular events real time length. For example, geofence events 403a, 403b may be a live event occurring in real time wherein the start date/time or end date/time mirror length or duration of the geofence. Alternatively, in some embodiments, the geofence event 403a, 403b may linked to a particular store and only be active during the store's real world hours. Thus, the geofence may deactivate while the store is closed and reactivate during the store's business hours. The mapping module 207 may download, retrieve or stream the geofence data over network 120 and save the geofence data into memory device 215. The mapping module 207 may periodically download updates to the geofence data which may be provided by either the geofence management system 301 or the campaign management system 101.

Figure 5:
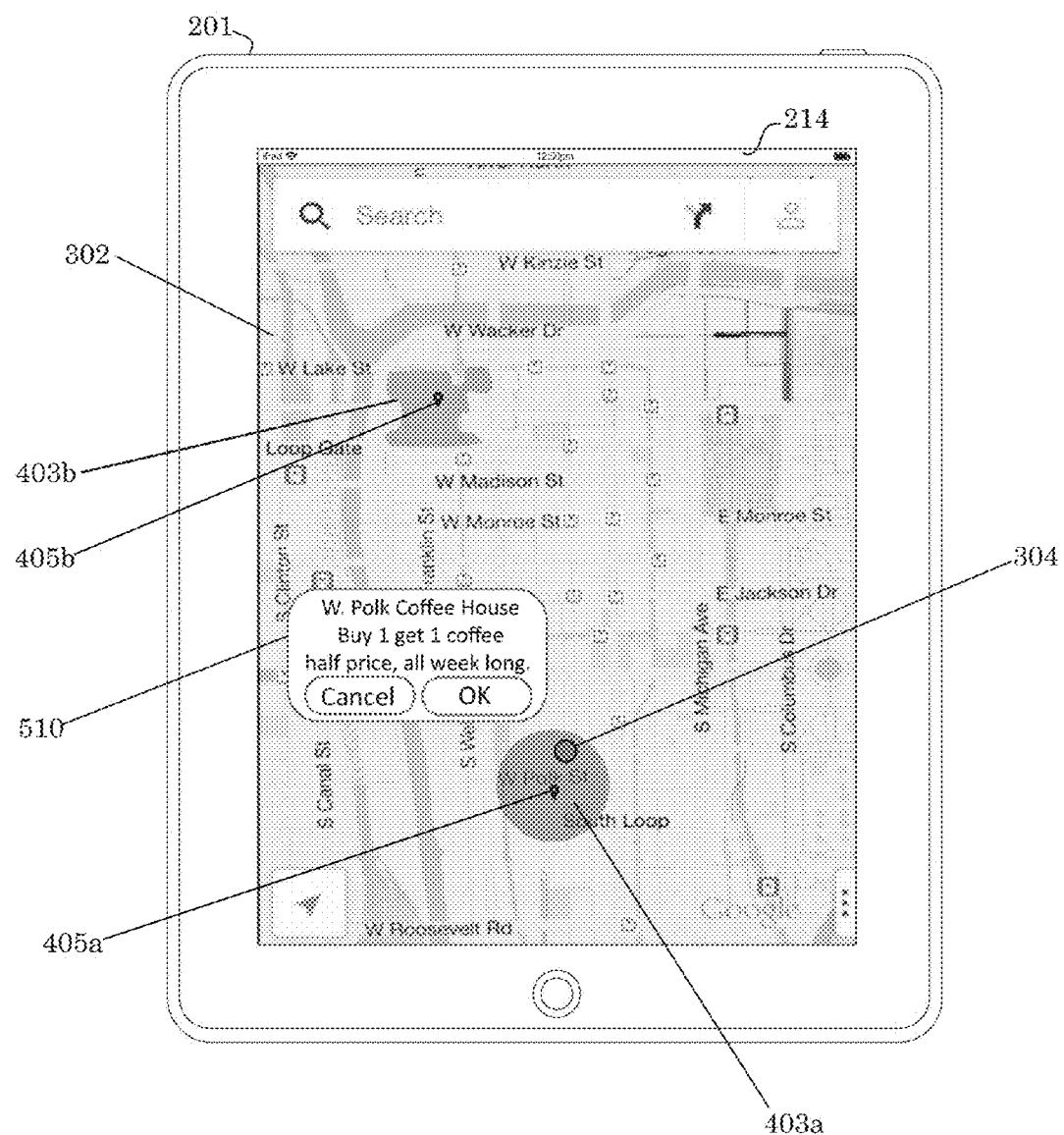
FIG. 5 illustrates an embodiment of the mapping interface of FIG. 3 and a tracked device entering, exiting or dwelling within an embodiment of a geofence.

Embodiments of the mapping module 207 may further download and retrieve campaign messages 510, 610 from the campaign management system and/or the geofence management system 301 as a function of the location information in comparison with the geofence boundary 403a, 403b. As shown in FIGS. 4-7, the boundaries 403a, 403b of each geofence can be any shape and size. For example, the boundary may be circular, square, rectangular, triangular, hexangular, etc. and even irregular shaped as depicted by geofence boundary 403b. Different campaign messages may be displayed as a function of the tracked device's 201 position, relative to the geofence boundary 403a, 403b and the geofence event 405a, 405b. As depicted by the embodiment of FIG. 5, the device location 304 of the tracked device 201 has changed location. As shown, the device location 304 has repositioned as a function of the location information to be inside the geofence boundary 403a. In response to the penetration of the device location 304 into the geofence boundary 403a, the geofence management system 301 may transmit a campaign message 510 corresponding to the geofence event 405a, while the geofence event 405a is still operating under an active marketing campaign.

Figure 6:
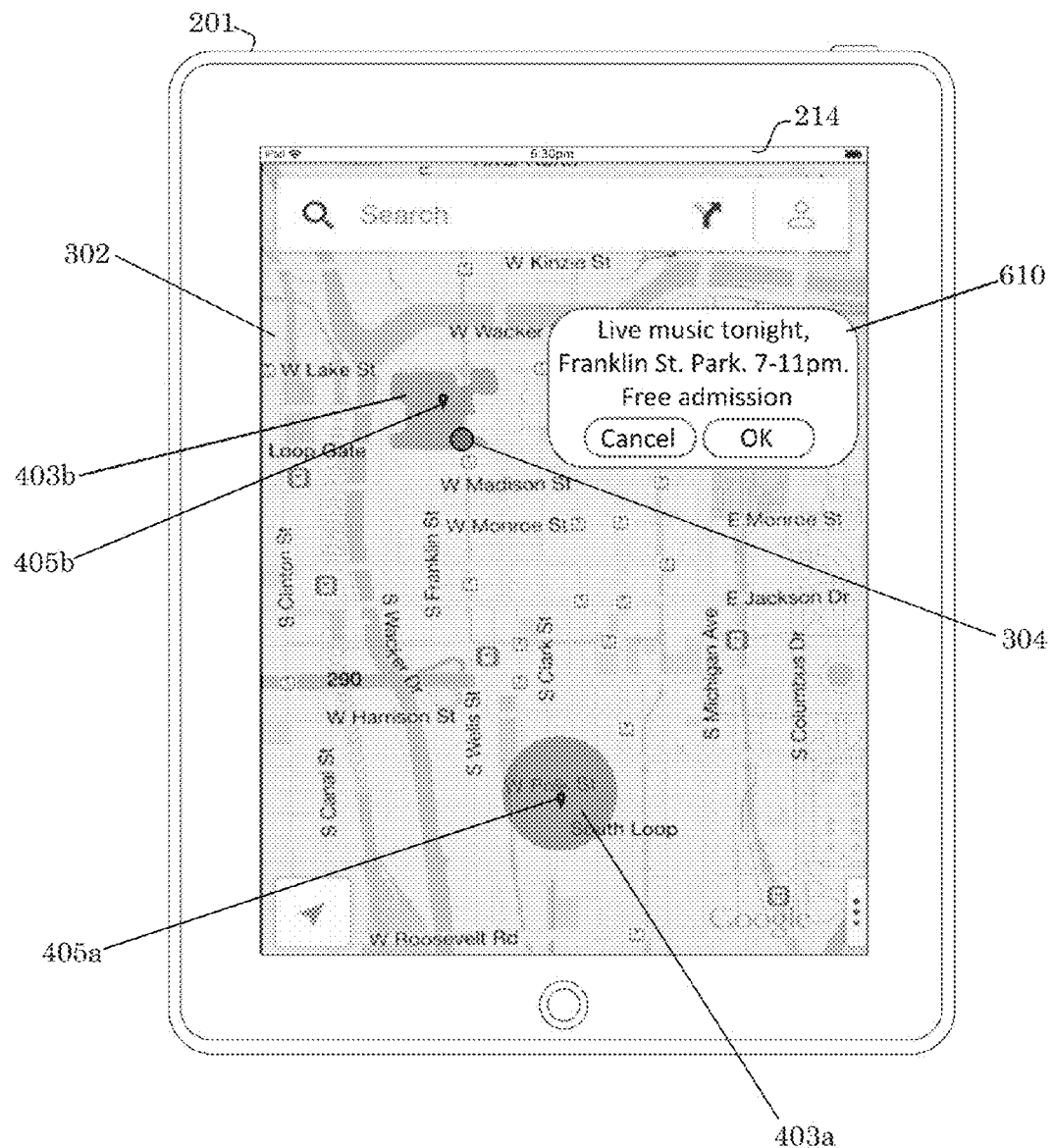
FIG. 6 illustrates an embodiment of the mapping interface of FIG. 3 and a tracked device entering, exiting or dwelling within an alternative embodiment of a geofence.

Conversely, FIG. 6 depicts an embodiment of a tracked device 201 having a device location 304 positioned within the geofence boundary 403b of the geofence event 405b. As it can be observed, the marketing campaigns for geofence events 405a and 405b differ from one another, thus, the campaign messages 510, 610 delivered when the geofence boundary 403a, 403b is penetrated differs accordingly. As shown in FIG. 6, upon the change in position of the device location 304 to a location within the geofence boundary 403b of geofence event 405b, the geofence management system 301 transmits a campaign message 610 associated with the marketing campaign of geofence event 405b. In an embodiment of the geofence system 100, wherein the geofence events 405a, 405b are derived from different marketing campaigns, the campaign messages 510, 610 may differ as depicted by the figures. However, in some embodiments, the marketing campaigns may be the same campaign and thus penetrating the geofence boundaries 403a, 403b may result in the receipt of the same message. Embodiments of the reporting module 209 may receive the campaign messages provided by the geofence management system 301 and/or campaign management system 201. The reporting module 209 may display the appropriate campaign message on the display device 214 of the tracked device 201 triggering the geofences programmed transition.

Figure 7:
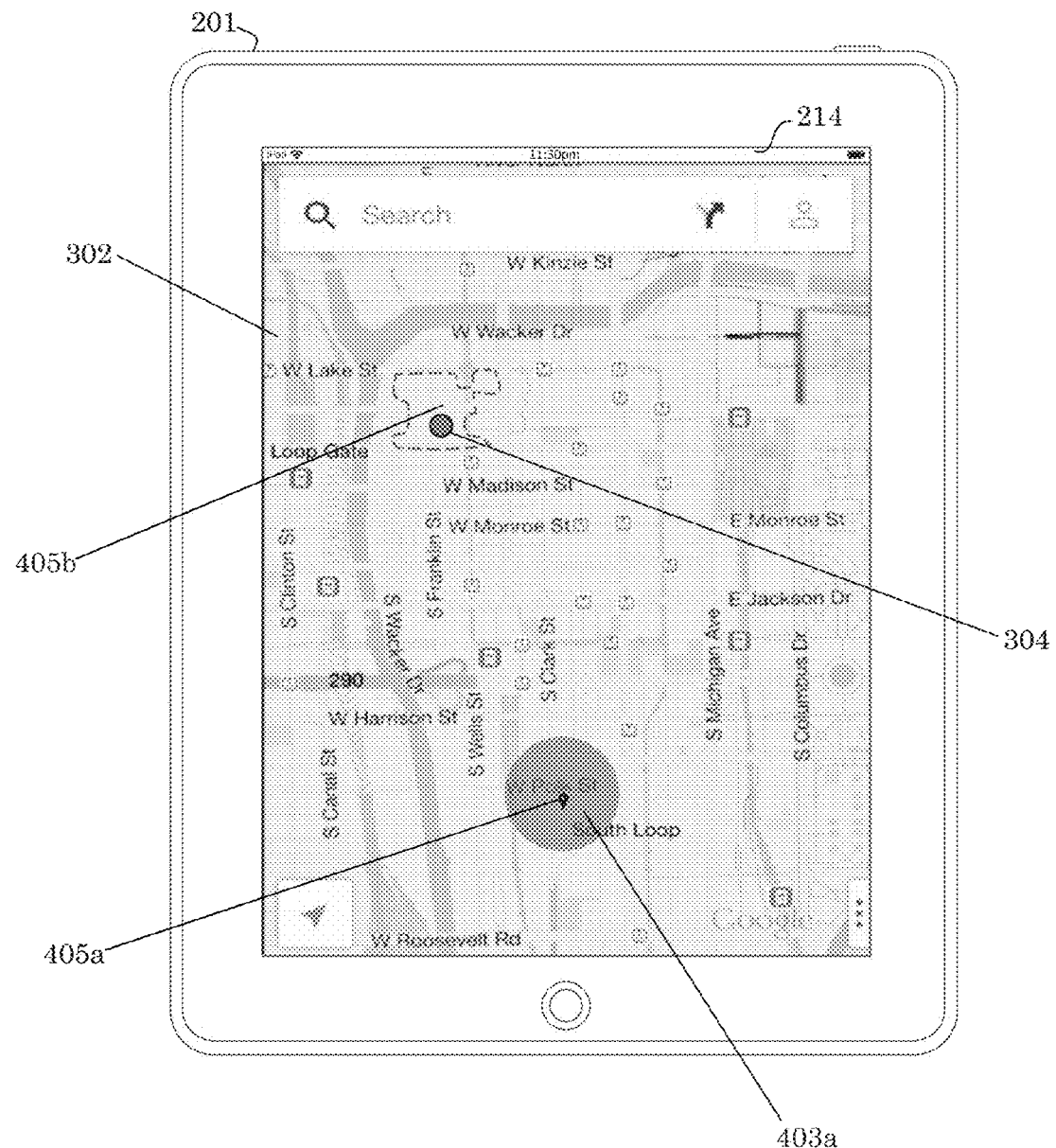
FIG. 7 illustrates an embodiment of the mapping interface of FIG. 3 entering, exiting or dwelling within a geofence after an end date of a marketing campaign.

Embodiments of the mapping module 207 may continue to map and track the device location 304, even after the deactivation of one or more geofences. As shown in FIG. 7, one or more geofence events 405a, 405b may automatically deactivate as a function of the parameters prescribed during geofence creation by the campaign management system. For instance, once a marketing campaign associated with a geofence expires, the geofence may automatically deactivate. The mapping module 207 of the mapping interface 302 may manually or automatically update as one or more campaign dependent geofences expire. As shown in the Example of FIG. 7, the geofence event 405b has expired. Even though the device location 304 is within the original geofence boundary 403b, the geofence no longer displays the affiliated campaign message 610 because the marketing campaign has ended.

In some embodiments, the campaign dependent geofence may be merely inactive once the marketing campaign has expired. In alternative embodiments, the deletion module 335 of the geofence management system may schedule the campaign dependent geofence for deletion. In certain embodiments, the geofence may not be deleted, but rather scheduled for reactivation at a later time period prescribed by the campaign management system 101. The campaign may be a rolling campaign that periodically activates and deactivates for a set period of time before reactivating automatically. In some embodiments, the tracking module 327 of the geofence management system may continue to collect and report informational device data 210 (or metadata) about the tracked devices 201 that may continue to enter, dwell or exit the boundary of the deactivated geofence. The collected informational device data 210 may be stored by the campaign management system 101 and used to determine the popularity of a geofence or potential geofence region. The campaign module 125 may determine one or more particular regions on the map to be optimal locations or demographics when it comes time to activate a new geofence. Likewise, the campaign module may also determine that a selected region for a geofence does not meet a particular standard. For example the previously selected location may not attract enough tracked devices 201 or attracts users of a demographic not in tune with the marketing campaign's demographics.

In some embodiments, the mapping module 207 may retrieve and display a secondary message to tracked devices 201 that enter a deactivated geofence. The secondary messages may provide messages about previous campaigns, upcoming campaigns to be aware of in the current deactivated geofence or potential marketing opportunities for business to create a geofence within the deactivated geofence.

Method for Modifying Campaign Dependent Geofence

Figure 8:
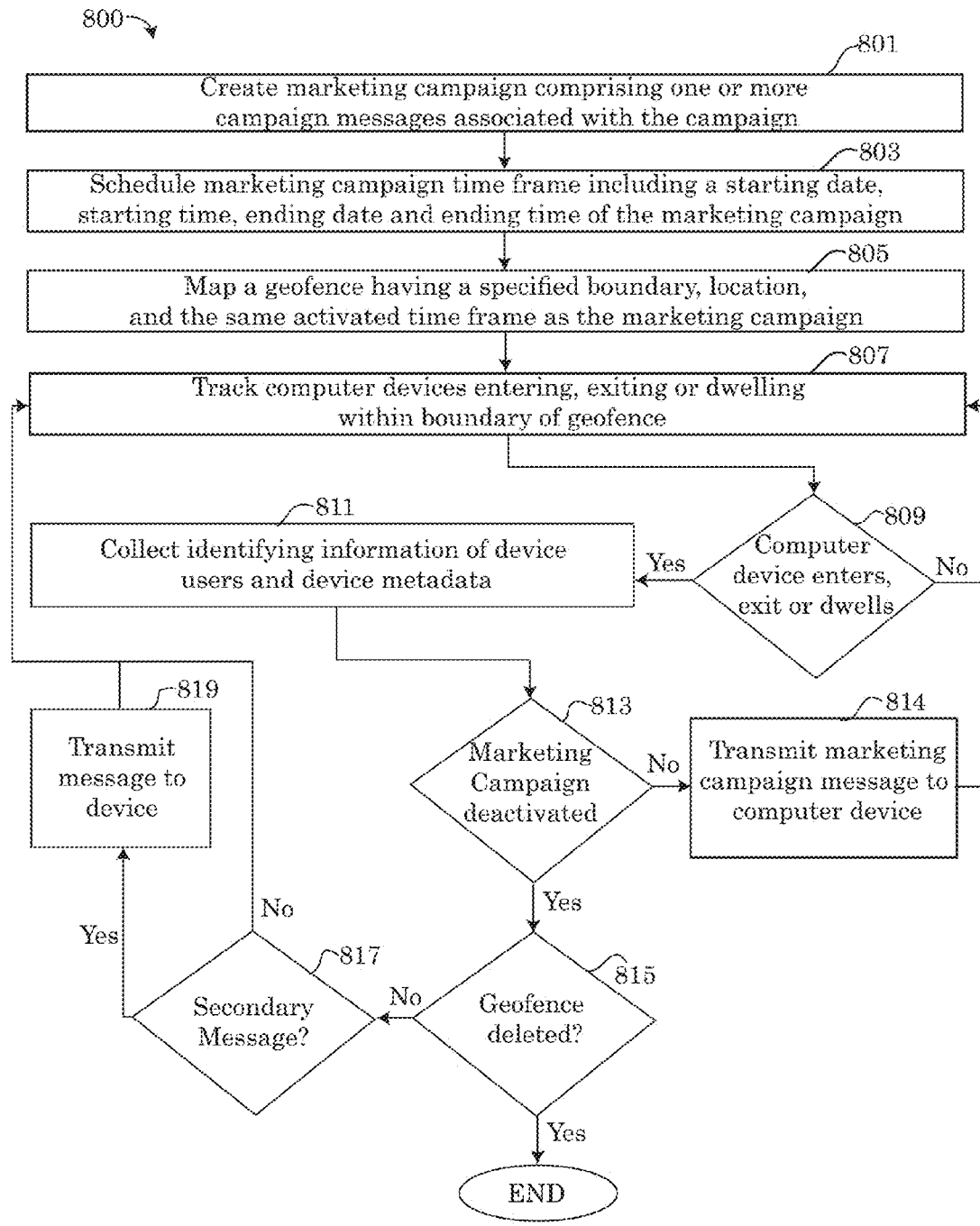
FIG. 8 illustrates an embodiment of a method for modifying a campaign dependent geofence.

The drawing of FIG. 8 represents an embodiment of a method or algorithm that may be implemented for modifying campaign dependent geofences in accordance with the geofence systems 100 described in FIGS. 1-7 using one or more computers as defined generically in FIG. 9 below, and more specifically by the embodiments of specialized computer systems 101, 201, 301 presented in FIGS. 1-7. A person skilled in the art should recognize that the steps of the algorithm described in FIG. 8 may be performed in a different order than presented by FIG. 8 and the algorithm may not require all of the steps described herein to be performed. Rather, some embodiments may create and terminate campaign dependent geofences using only one or more of the steps discussed below.

The embodiment of the method 800 for modifying campaign dependent geofences may begin at step 801. In step 801, the campaign management system 101 may create a marketing campaign comprising one or more campaign messages. The campaign messages may be created by the campaign module 125 and stored in the campaign management database 111 as depicted in the flow chart of FIG. 2. In some embodiments, the campaign module 125 may create a campaign name or other unique identifier to identify the particular campaign being created The campaign name or identifier may be selected by a user or administrator of the campaign management system 101 and input via the campaign input data 206. In step 803 the campaign module 125 may further receive campaign input data 206 comprising one or more parameters of the marketing campaign. The campaign module 125 receiving the campaign input data 206, may further schedule the marketing campaign as a function of the campaign input data 206, including the duration of the campaign (i.e. the starting date, and time, ending date and time), the campaign repeatability cycle (if any) the regional locations affected by the campaign.

In step 805, the geofence system 100 may map the geofence having a specified boundary, location and the same activated time frame (start/end times) as the marketing campaign created in steps 801 and 803. The step of mapping the geofence in step 805 may begin by the mapping module 107 of the campaign management system inputting one or more parameters of the geofence being mapped. As shown by them embodiment of FIG. 2, the campaign mapping module 107, may receive the parameters as geofence configuration data 306 which may be inputted by a user or administrator of the campaign management system 101. Embodiments of the mapping module 107 may input each of the parameters of the geofence corresponding to the marketing campaign as prescribed by the geofence configuration data 306. The parameters entered by the campaign module may include an activation time (start date/time, end date/time), cycling time and a region that matches the marketing campaign of steps 801 and 803. The mapping module 107 may select one or more locations for the geofence to be activated. The mapping module 107 may also continue by selecting the shape and size of the geofence in accordance with the campaign location and the geofence configuration data 306. The campaign mapping module may link the campaign messages from step 801 to the geofence configured by the mapping module 108 or retrieve and load the campaign messages from the campaign module 103.

Figure 2:
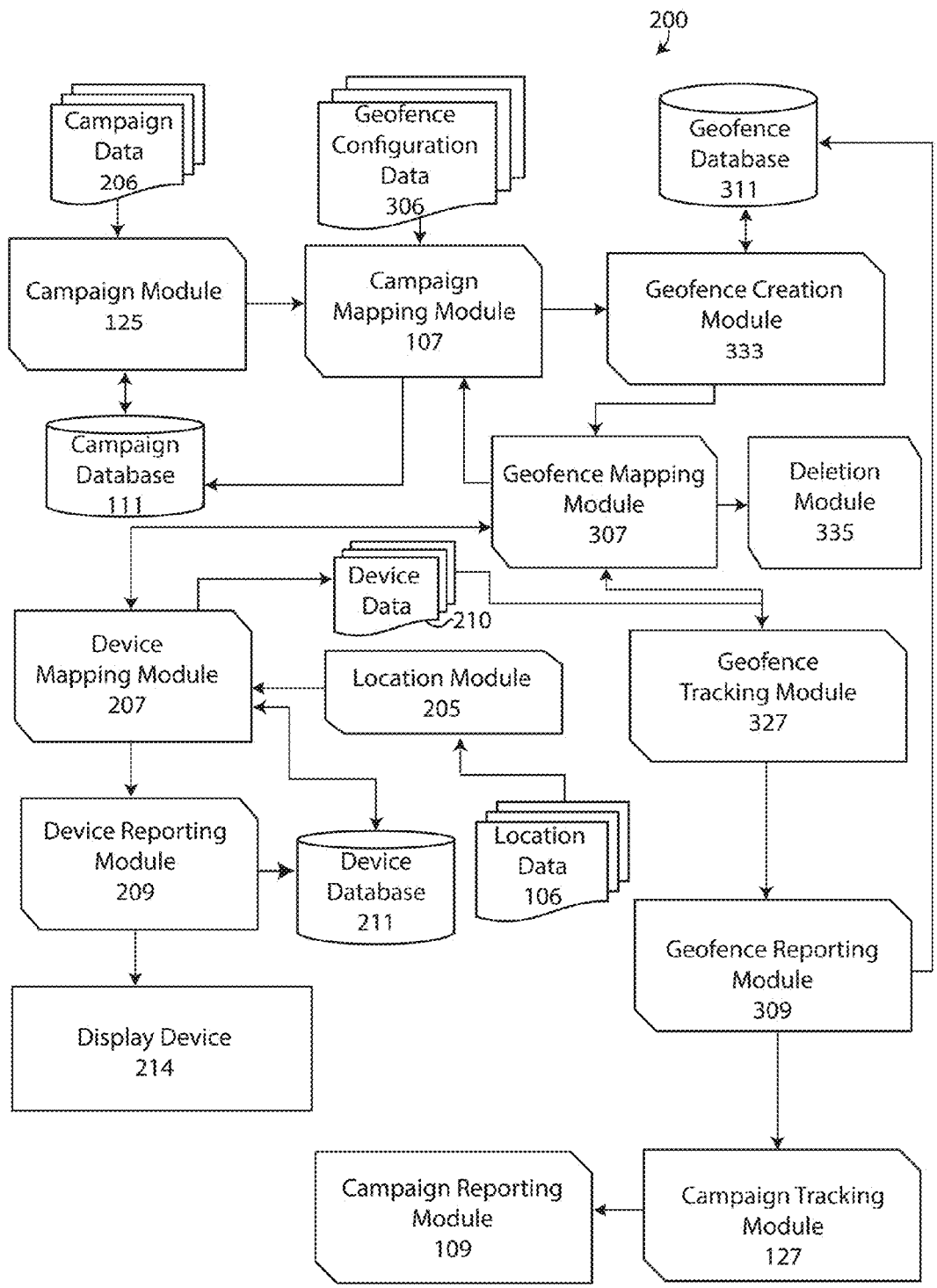
FIG. 2 depicts a flow chart describing the system for modifying a campaign dependent geofence.
Figure 3:
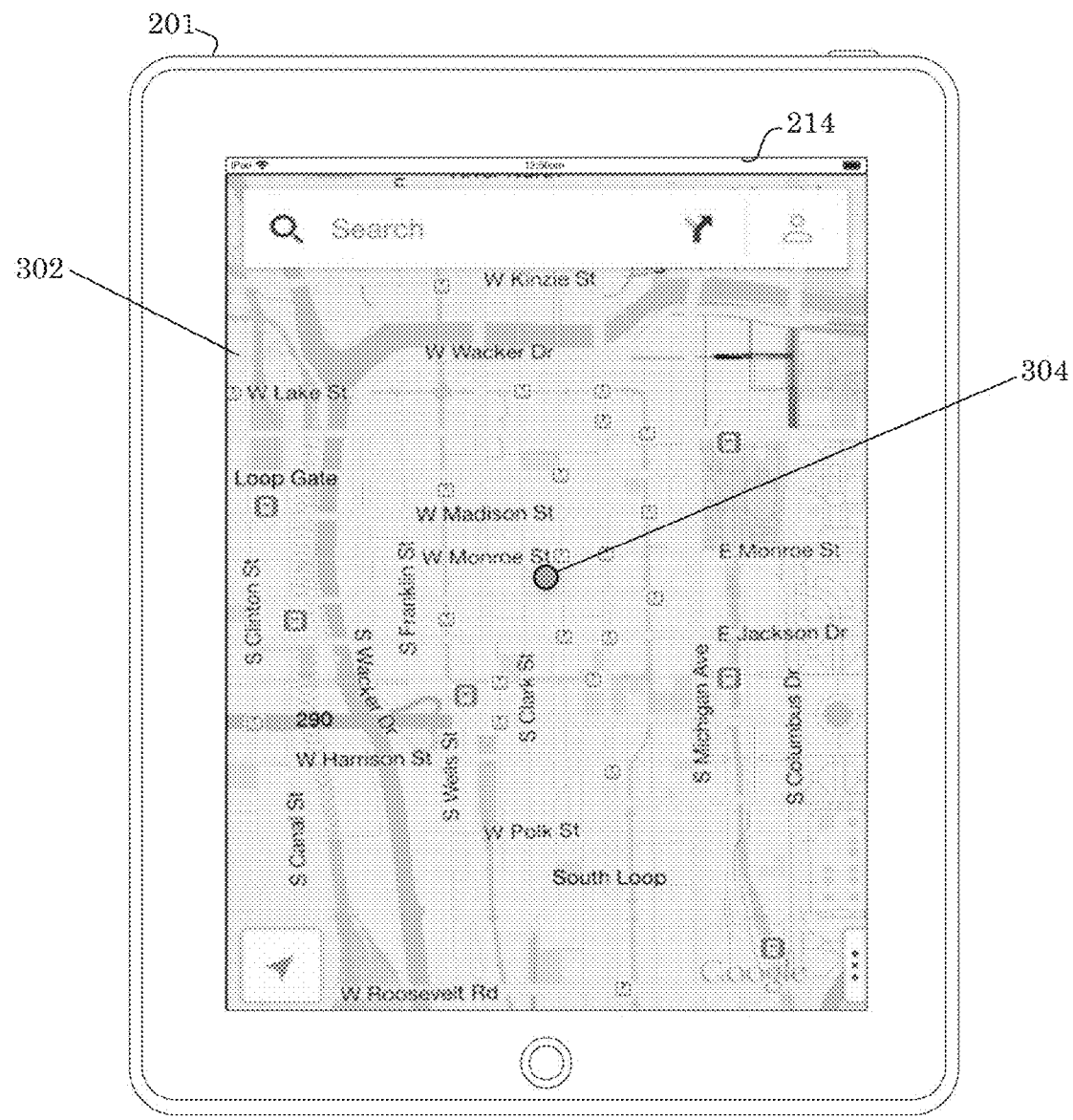
FIG. 3 illustrates an embodiment of geo-fencing module displaying a mapping interface.

Once the mapping module 107 has completed the configuration settings of the geofence as a function of the campaign and input data 206, 306, the mapping module may subsequently perform an API call to the geofence management system 301. The API call may be made request the geofence module 303 of the geofence management system 301 to generate a geofence having each of the properties configured by the mapping module 107. The request for generating the campaign dependent geofence may be received by the geofence creation module 333. The geofence creation module 333 may analyze the configured settings received from the campaign mapping module 107. In some embodiments, the creation module 333 may check for anomalies, inconsistencies and errors between the geofence configuration data 306 and the campaign data 206 and if there are inconsistencies, anomalies or errors, the creation module may return an error to the campaign management system 101 and allow for correction. Likewise, the creation module 333 may generate a geofence having a time (frame) duration, expiration location, size, acceptable transitions and campaign messages prescribed by the configuration data received from the campaign mapping module 107. As shown in FIG. 2, the geofence data may be stored by the creation module 333 in the geofence database 311.

The mapping step 805 may continue by transmitting the geofence generated by the creation module 333 to the geofence management system's 301 mapping module 307. The mapping module 307 may visually map the locations of the created geofence and distribute the data depicting the geofence mapped to a mapping interface to the campaign mapping module 107 and/or tracked device's mapping module 207. Upon receiving the campaign dependent geofence, the device's mapping module 207 may plot each of the geofence's onto a mapping interface 302 displaying the device's location 304, each geofence event 405*a*, 405*b* and/or each geofence boundary 403*a*, 403*b*.

In step 807 of method 800, upon loading the geofence into the mapping module 207 of the tracked device 201 the system 100 may track each of tracked computer devices 201 location, identifying any tracked devices 201 that may meet the programmed transition of entering, exiting or dwelling within a geofence boundary 403a, 403b. The tracking step may be performed by geofence tracking module 327 and/or the device mapping module 207 receiving location data 106 of the tracked device 201 collected by location module 205. Embodiments of the geofence system 100, may compare the received location data 106 with the location of each of the mapped geofence boundaries. In step 809, the geofence tracking module 327 making the comparison between the location data and the mapped geofence may determine whether or not the tracked computer device 201 has entered, exited or dwelled within a mapped geofence boundary of the marketing campaign. If, in step 809, it is determined that the tracked computer device 201 has not performed a transition defined to trigger a campaign message from the geofence, the method 800 may return to step 807 and continue to track the location of the computer devices 201 that have loaded the geofence of the marketing campaign.

If, on the other hand, the geofence tracking module 327 identifies that the tracked computer device 201 has met one or more conditions for trigger a transition, by entering exiting or dwelling within the geofence as a function of the location data 106, in step 811, the tracking module 307 may collect device data 210 or metadata including identifying information about the tracked device 201 and the device's users. The device data 210 collected by the geofence tracking module 327 may be stored in the geofence database 311, network repository 239 and/or transmitted to the campaign tracking module 127 via the geofence's reporting module 309. The device data collected may provide valuable information to the campaign management system regarding the number of devices interacting with the geofence, the number of campaign messages accepted or ignored, the demographics of the device user's and other statistical information that may gauge the success or failure of the marketing campaign. Identifying the success or failure of a particular marketing campaign may include the steps of counting the number of tracked computer devices 201 entering, exiting or dwelling within the boundaries of the geofence while the geofence is activated. The geofence system 100 may identify the effectiveness of the marketing campaign as a function of the number of computer devices entering, exiting or dwelling within the boundaries of the geofence, the number of tracked computer devices 201 receiving a campaign message pushed to the tracked computer device 201 and the number of tracked user devices who received the pushed campaign messages arrive at the geofence event location and/or take advantage of a promotion or advertisement that was pushed to the device 201.

As tracked devices 201 transition into and out of the geofence's boundaries 403a, 403b in step 809, the geofence management system may in step 813, identify whether or not the marketing campaign is currently activated or deactivated as a function of the geofence's parameters. If, in step 813, it is determined by the geofence system 100 that the marketing campaign is not deactivated, the geofence mapping module 307 may in step 814 transmit a campaign message linked to the geofence to mapping module 207 of the tracked device. The reporting module 209 of the tracked device 201 may display the campaign message transmitted on the display device 214 as a function of the tracked device 201 fulfilling the transitional requirements of entering, exiting or dwelling within the geofence's boundaries. The campaign message, once transmitted to the tracked device 201, may continue to track each the devices 201 in accordance with step 807 of this described method 800.

If, in step 813, the marketing campaign has expired and thus deactivated, the geofence mapping module 307 may additionally make a determination whether or not the geofence has been deleted by the deletion module 335 in step 815. As described above, at the expiration of a marketing campaign, a geofence may be temporarily deactivate the geofence, scheduled for the geofence for deletion at a later time or delete the geofence via the deletion module 335 of the geofence management system 301. If, the geofence has been deleted, no further action may be taken by the geofence system 100, until a new geofence has been created or a previous geofence stored by a database, repository or other storage device is recreated.

In some embodiments however, the geofence system 100 may be deactivated in step 813, but not deleted in step 815. An administrator of a marketing campaign may choose to deactivate a campaign dependent geofence rather than delete the geofence in order to continue to collect device data 210, statistics and demographics of the geofenced area. The campaign management system 101 may analyze the collected data acquired both during and after a marketing campaign has completed in order assess the viability of the geofence location.

In some embodiments, the geofence system 100 may in display secondary messages that may not be part of the campaign messages of an active geofence. In step 817, the geofence management system 301, via the mapping module 307, may assess whether or not the deactivated geofence includes a secondary message that may be transmitted to a tracked device 201 during a time period of deactivation. If there a secondary message has not been programmed to be transmitted to the tracked device 201, the method 800 may return to step 807 as described above, track computer devices 201 entering, exiting or dwelling within the deactivated geofence, continue to collect location data 106 and collect device data 210 from tracked devices 201. However, if a secondary message in step 817 has been programmed into the geofence during periods of activation, the secondary message may be transmitted from the geofence mapping module 307 to the mapping module 207 of the tracked device 207, wherein the secondary message is displayed by the reporting module 209 on display device 214. For instance, the secondary message may reveal missed promotional opportunities of the now expired marketing campaign, or encourage device users to come back at a future time frame to take advantage of an upcoming marketing campaign's geofence.

Computer System

Referring to the drawings, FIG. 9 illustrates a block diagram of a computer system 900 that may be included in the systems of FIGS. 1-7 and for implementing methods for modifying campaign dependent geofences as shown in the embodiment of FIG. 8 and in accordance with the embodiments described in the present disclosure. The computer system 900 may generally comprise a processor, otherwise referred to as a central processing unit (CPU) 991, an input device 992 coupled to the processor 991, an output device 993 coupled to the processor 991, and memory devices 994 and 995 each coupled to the processor 991. The input device 992, output device 993 and memory devices 994, 995 may each be coupled to the processor 991 via a bus. Processor 991 may perform computations and control the functions of computer 900, including executing instructions included in the computer code 997 for tools and programs for modifying campaign dependent geofences, in the manner prescribed by the embodiments of the disclosure using the systems of FIGS. 1-7, wherein the instructions of the computer code 997 may be executed by processor 991 via memory device 995. The computer code 997 may include software or program instructions that may implement one or more algorithms for implementing the methods for modifying campaign dependent geofences, as described in detail above. The processor 991 executes the computer code 997. Processor 991 may include a single processing unit, or may be distributed across one or more processing units in one or more locations (e.g., on a client and server).

The memory device 994 may include input data 996. The input data 996 includes any inputs required by the computer code 997. The output device 993 displays output from the computer code 997. Either or both memory devices 994 and 995 may be used as a computer usable storage medium (or program storage device) having a computer readable program embodied therein and/or having other data stored therein, wherein the computer readable program comprises the computer code 997. Generally, a computer program product (or, alternatively, an article of manufacture) of the computer system 900 may comprise said computer usable storage medium (or said program storage device).

Memory devices 994, 995 include any known computer readable storage medium, including those described in detail below. In one embodiment, cache memory elements of memory devices 994, 995 may provide temporary storage of at least some program code (e.g., computer code 997) in order to reduce the number of times code must be retrieved from bulk storage while instructions of the computer code 997 are executed. Moreover, similar to processor 991, memory devices 994, 995 may reside at a single physical location, including one or more types of data storage, or be distributed across a plurality of physical systems in various forms. Further, memory devices 994, 995 can include data distributed across, for example, a local area network (LAN) or a wide area network (WAN). Further, memory devices 994, 995 may include an operating system (not shown) and may include other systems not shown in the figures.

In some embodiments, the computer system 900 may further be coupled to an Input/output (I/O) interface and a computer data storage unit (for example a data store, data mart or repository). An I/O interface may include any system for exchanging information to or from an input device 992 or output device 993. The input device 992 may be, inter alia, a keyboard, a mouse, sensors, biometric input device, camera, timer, etc. The output device 993 may be, inter alia, a printer, a plotter, a display device (such as a computer screen or monitor), a magnetic tape, a removable hard disk, a floppy disk, etc. The memory devices 994 and 995 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 900, and may include any type of transmission link, including electrical, optical, wireless, etc.

An I/O interface may allow computer system 900 to store information (e.g., data or program instructions such as program code 997) on and retrieve the information from a computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that modifies campaign dependent geofences, to deploy or integrate computing infrastructure with respect to accessing content of a shared account. Thus, an embodiment of the present invention discloses a process for supporting computer infrastructure, where the process includes providing at least one support service for at least one of integrating, hosting, maintaining and deploying computer-readable code (e.g., program code 997) in a computer system (e.g., computer 900) including one or more processor(s) 991, wherein the processor(s) carry out instructions contained in the computer code 997 causing the computer system to modify campaign dependent geofences. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of accessing content of a shared account. Thus the present invention discloses a process for supporting, deploying and/or integrating computer infrastructure, integrating, hosting, maintaining, and deploying computer-readable code into the computer system 900, wherein the code in combination with the computer system 900 is capable of performing a method of modifying campaign dependent geofences.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A campaign dependent geofence modification method comprising:

creating, by a processor of a specialized computer system comprising a specialized configuration of hardware, a marketing campaign comprising one or more campaign messages comprising virtualized hardware physically located via a network connected to said specialized computer system, wherein said specialized computer system includes a geofence module including specialized circuitry and chipsets physically connected within said geofence module, and wherein said specialized circuitry executes computer readable program instructions by utilizing state information of the computer readable program instructions to personalize the electronic circuitry in order to perform the campaign dependent geofence modification technical improvement method;

scheduling, by the processor, a start date and an end date to the marketing campaign;

further scheduling, by the processor, a deletion date for a geofence, wherein the deletion date is a pre-set time after the end date of the marketing campaign;

receiving, by said processor via virtualized hardware of a network, an application programming interface (API) call;

storing, by said processor, said API call within a memory device;

generating by said processor, said geofence based on said API call;

storing, by said processor, said geofence within said memory device;

mapping, by the processor executing a mapping module of said geofence module, the geofence having a specified virtual boundary including specified limits including a longitude, latitude, and radius with a location and size, and parameters corresponding to the marketing campaign including the start date, the end date and the one or more campaign messages;

tracking, by the processor via sensors, a computer device entering, exiting or dwelling within the specified virtual boundary of the geofence;

determining, by the processor enabling a transceiver of said computing system, a location of the tracked computer device broadcasting location data from a location module comprising positioning capabilities selected from the group consisting of a global positioning system (GPS), Wi-Fi, Bluetooth and Bluetooth low energy;

monitoring, by the processor, a position of the tracked computer device in real time as the tracked computer device changes location;

transmitting, by the processor, the one or more campaign messages to the tracked computer device entering, exiting or dwelling within the specified virtual boundary of the geofence as a function of the location of the tracked computer device being monitored between the start date and the end date of the geofence marketing campaign;

automatically deactivating, by the processor executing a module including portions of said specialized circuitry and chipsets, the geofence as a function of the end date of the marketing campaign thereby disabling a virtual boundary during off hours of a structure associated with said marketing campaign;

further transmitting, by the processor, a secondary message that is different from the one or more campaign messages, to the tracked computer device entering, exiting or dwelling within the specified boundary of the geofence during a deactivated time period between the end date and the deletion date;

automatically reactivating, by the processor executing said module including portions of said specialized circuitry and chipsets, the geofence as a function of an end time of said off hours thereby enabling said virtual boundary;

enabling, by said processor in response to said secondary message and said automatically reactivating, a user of said tracked computer device such that said user initiates motion and enters the specified virtual boundary of the geofence traveling towards promotions of said marketing campaign causing said user to execute a purchase associated with said promotions; and automatically deleting, by the processor, the geofence as a function of the deletion date, thereby improving a geofence specialized hardware system comprising the tracked computer device equipped with an operating system by limiting a number of simultaneously active geofences thereby improving a functionality of said operating system by preventing geo-fencing device limitations associated with removing interference associated with retrieving or mapping currently relevant geofences that may otherwise be unavailable or unviewable.

2. The method of claim 1, further comprising the step of automatically activating, by the processor, the geofence, as a function of the start date of the marketing campaign.

3. The method of claim 1, wherein the geofence is mapped to the location of a live event occurring in real time and the start date and end date correspond to a start time and an end time of the live event.

4. The method of claim 1, further comprising the step of:
reporting, by the processor, a schedule comprising one or more pending geofences, wherein each of the pending geofences are scheduled for activation upon commencement of an upcoming marketing campaign start date; and displaying, by the processor, the schedule to a user of the computer system.

5. The method of claim 1, further comprising the step of:
creating, by the processor, the geofence having the specified boundary and parameters corresponding to the marketing campaign automatically on the start date of the marketing campaign.

6. The method of claim 1, further comprising the step of:
selecting, by the processor, a deletion date for deleting the geofence, wherein the deletion date occurs after the end date of the marketing campaign.

7. The method of claim 1, further comprising the steps of:
loading, by the tracked computer device, the geofence into a memory device;

mapping, by the tracked computer device, the location of the geofence;

comparing, by the tracked computer device, the location data of the tracked computer device and the location of the geofence; and displaying, by the tracked computer device, a push notification as a function of the location data of the tracked computer device entering, exiting or dwelling within the geofence during a time frame between the start date and end date of the marketing campaign.

8. A specialized computer system comprising a specialized configuration of hardware, comprising:
a central processing unit (CPU);
a memory device coupled to the CPU; and
a computer readable storage device coupled to the processor, wherein the storage device contains program code executable by the CPU via the memory device to implement a campaign dependent geofence modification method comprising:

creating, by the CPU, a marketing campaign comprising one or more campaign messages comprising virtualized hardware physically located via a network connected to said specialized computer system, wherein said specialized computer system includes a geofence module including specialized circuitry and chipsets physically connected within said geofence module, and wherein said specialized circuitry executes computer readable program instructions by utilizing state information of the computer readable program instructions to personalize the electronic circuitry in order to perform a campaign dependent geofence modification method;

scheduling, by the CPU, a start date and an end date to the marketing campaign;

further scheduling, by the CPU, a deletion date for a geofence, wherein the deletion date is a pre-set time after the end date of the marketing campaign;

receiving, by the CPU via virtualized hardware of a network, an application programming interface (API) call;

storing, by the CPU, said API call within a memory device;

generating by the CPU, said geofence based on said API call;

storing, by the CPU, said geofence within said memory device;

mapping, by the CPU executing a mapping module of said geofence module, the geofence having a specified virtual boundary including specified limits including a longitude, latitude, and radius with a location and size, and parameters corresponding to the marketing campaign including the start date, the end date and the one or more campaign messages;

tracking, by the CPU via sensors, a computer device entering, exiting or dwelling within the specified virtual boundary of the geofence;

determining, by the CPU enabling a transceiver of said computing system, a location of the tracked computer device broadcasting location data from a location module comprising positioning capabilities selected from the group consisting of a global positioning system (GPS), Wi-Fi, Bluetooth and Bluetooth low energy;

monitoring, by the CPU, a position of the tracked computer device in real time as the tracked computer device changes location;

transmitting, by the CPU, the one or more campaign messages to the tracked computer device entering, exiting or dwelling within the specified virtual boundary of the geofence as a function of the location of the tracked computer device being monitored between the start date and the end date of the geofence marketing campaign;

automatically deactivating, by the CPU executing a module including portions of said specialized circuitry and chipsets, the geofence as a function of the end date of the marketing campaign thereby disabling a virtual boundary during off hours of a structure associated with said marketing campaign;

further transmitting, by the CPU, a secondary message that is different from the one or more campaign messages, to the tracked computer device entering, exiting or dwelling within the specified boundary of the geofence during a deactivated time period between the end date and the deletion date;

automatically reactivating, by the CPU executing said module including portions of said specialized circuitry and chipsets, the geofence as a function of an end time of said off hours thereby enabling said virtual boundary;

enabling, by said CPU in response to said secondary message and said automatically reactivating, a user of said tracked computer device such that said user initiates motion and enters the specified virtual boundary of the geofence traveling towards promotions of said marketing campaign causing said user to execute a purchase associated with said promotions; and automatically deleting, by the CPU, the geofence as a function of the deletion date, thereby improving a geofence specialized hardware system comprising the tracked computer device equipped with an operating system by limiting a number of simultaneously active geofences thereby improving a functionality of said operating system by preventing geo-fencing device limitations associated with removing interference associated with retrieving or mapping currently relevant geofences that may otherwise be unavailable or unviewable.

9. The system of claim 8, further comprising automatically activating, by the CPU, the geofence, as a function of the start date of the marketing campaign.

10. The system of claim 8, wherein the geofence is mapped to the location of a live event occurring in real time and the start date and end date of the marketing campaign correspond to a start time and an end time of the live event.

11. The method of claim 1, further comprising the step of:
reporting, by the CPU, a schedule comprising one or more pending geofences, wherein each of the pending geofences are scheduled for activation upon commencement of an upcoming marketing campaign start date; and
displaying, by the CPU, the schedule to a user of the computer system.

12. The system of claim 8, further comprising the step of:
selecting, by the CPU, a deletion date for deleting the geofence, wherein the deletion date occurs after the end date of the marketing campaign.

13. The system of claim 8, further comprising the steps of:
loading, by the tracked computer device, the geofence into a memory device;
mapping, by the tracked computer device, the location of the geofence;
comparing, by the tracked computer device, the location data of the tracked computer device and the location of the geofence; and
displaying, by the tracked computer device, a push notification as a function of the location data of the tracked computer device entering, exiting or dwelling within the geofence during a time frame between the start date and end date of the marketing campaign.

14. A computer program product comprising:
one or more computer readable hardware storage devices having computer readable program code stored therein, said program code containing instructions executable by one or more central processing units (CPU) of a specialized computer system comprising a specialized configuration of hardware to implement a campaign dependent geofence modification method comprising:
creating, by the CPU, a marketing campaign comprising one or more campaign messages comprising virtualized hardware physically located via a network connected to said specialized computer system, wherein said specialized computer system includes a geofence module including specialized circuitry and chipsets physically connected within said geofence module, and wherein said specialized circuitry executes computer readable program instructions by utilizing state information of the computer readable program instructions to personalize the electronic circuitry in order to perform the campaign dependent geofence modification method;

scheduling, by the CPU, a start date and an end date to the marketing campaign;

further scheduling, by the CPU, a deletion date for the geofence, wherein the deletion date is a pre-set time after the end date of the marketing campaign;

receiving, by the CPU via virtualized hardware of a network, an application programming interface (API) call;

storing, by the CPU, said API call within a memory device;

generating by the CPU, said geofence based on said API call;

storing, by the CPU, said geofence within said memory device;

mapping, by the CPU executing a mapping module of said geofence module, a geofence having a specified boundary including specified limits including a longitude, latitude, and radius with a location and size, and parameters corresponding to the marketing campaign including the start date, the end date and the one or more campaign messages;

tracking, by the CPU via sensors, a computer device entering, exiting or dwelling within the specified virtual boundary of the geofence;

determining, by the CPU enabling a transceiver of said computing system, a location of the tracked computer device broadcasting location data from a location module comprising positioning capabilities selected from the group consisting of a global positioning system (GPS), Wi-Fi, Bluetooth and Bluetooth low energy;

monitoring, by the CPU, a position of the tracked computer device in real time as the tracked computer device changes location;

transmitting, by the CPU, the one or more campaign messages to the tracked computer device entering, exiting or dwelling within the specified virtual boundary of the geofence as a function of the location of the tracked computer device being monitored between the start date and the end date of the geofence marketing campaign;

automatically deactivating, by the CPU executing a module including portions of said specialized circuitry and chipsets, the geofence as a function of the end date of the marketing campaign thereby disabling a virtual boundary during off hours of a structure associated with said marketing campaign;

further transmitting, by the CPU, a secondary message that is different from the one or more campaign messages, to the tracked computer device entering, exiting or dwelling within the specified boundary of the geofence during a deactivated time period between the end date and the deletion date;

automatically reactivating, by the CPU executing said module including portions of said specialized circuitry and chipsets, the geofence as a function of an end time of said off hours thereby enabling said virtual boundary;

enabling, by said CPU in response to said secondary message and said automatically reactivating, a user of said tracked computer device such that said user initiates motion and enters the specified virtual boundary of the geofence traveling towards promotions of said marketing campaign causing said user to execute a purchase associated with said promotions; and automatically deleting, by the CPU, the geofence as a function of the deletion date, thereby improving a geofence specialized hardware system comprising the tracked computer device equipped with an operating system by limiting a number of simultaneously active geofences thereby improving a functionality of said operating system by preventing geo-fencing device limitations associated with removing interference associated with retrieving or mapping currently relevant geofences that may otherwise be unavailable or unviewable.

15. The computer program product of claim 14, further comprising automatically activating, by the CPU, the geofence, as a function of the start date of the marketing campaign.

16. The computer program product of claim 14, wherein the geofence is mapped to the location of a live event occurring in real time and the start date and end date of the marketing campaign mirror a start time and an end time of the live event.

17. The computer program product of claim 14, further comprising the steps of selecting, by the processor, a deletion date for deleting the geofence, wherein the deletion date occurs after the end date of the marketing campaign.

18. The computer program product of claim 14 further comprising:
reporting, by the CPU, a schedule comprising one or more pending geofences, wherein each of the pending geofences are scheduled for activation upon commencement of an upcoming marketing campaign start date; and
displaying, by the CPU, the schedule to a user of the computer system.

19. The computer program product of claim 14, further comprising the steps of:
loading, by the tracked computer device, the geofence into a memory device;
mapping, by the tracked computer device, the location of the geofence;
comparing, by the tracked computer device, the location data of the tracked computer device and the location of the geofence; and
displaying, by the tracked computer device, a push notification as a function of the location data of the tracked computer device entering, exiting or dwelling within the geofence during a time frame between the start date and end date of the marketing campaign.

* * * * *